United States Patent
Mouret et al.

(10) Patent No.: US 12,355,503 B2
(45) Date of Patent: Jul. 8, 2025

(54) CALIBRATION APPARATUS FOR A COMMUNICATION SYSTEM

(71) Applicant: NXP USA, INC., Austin, TX (US)

(72) Inventors: Guillaume Mouret, Portet-sur-Garonne (FR); Yann Cargouet, Portet sur Garonne (FR); Tristan Bosvieux, Plaisance du Touch (FR)

(73) Assignee: NXP USA, Inc., Austin, TX (US)

( * ) Notice: Subject to any disclaimer, the term of this patent is extended or adjusted under 35 U.S.C. 154(b) by 164 days.

(21) Appl. No.: 18/366,731

(22) Filed: Aug. 8, 2023

(65) Prior Publication Data

US 2024/0063925 A1  Feb. 22, 2024

(30) Foreign Application Priority Data

Aug. 18, 2022 (EP) ..................................... 22306236

(51) Int. Cl.
*H04B 17/11* (2015.01)
*H04B 17/21* (2015.01)
*H04L 25/02* (2006.01)

(52) U.S. Cl.
CPC ............. *H04B 17/22* (2023.05); *H04B 17/11* (2015.01)

(58) Field of Classification Search
None
See application file for complete search history.

(56) References Cited

U.S. PATENT DOCUMENTS

| | | | |
|---|---|---|---|
| 6,418,500 B1 | 7/2002 | Gai et al. | |
| 7,439,789 B2 | 10/2008 | Nguyen | |
| 9,197,464 B2* | 11/2015 | Wu | ...................... H04L 25/0278 |
| 2005/0200380 A1 | 9/2005 | Rapport | |

(Continued)

FOREIGN PATENT DOCUMENTS

CN  112256612 A  1/2021

OTHER PUBLICATIONS

Huang, H., "Simultaneous Bidirectional Transceiver with Impedance Matching", 2008 15th IEEE International Conference on Electronics, Circuits and Systems, Aug. 31, 2008-Sep. 3, 2008.

*Primary Examiner* — Anh Q Tran

(57) ABSTRACT

A calibration apparatus for a communication system. The calibration apparatus is configured to: a) set a variable termination-resistance at a receiver to a predetermined value; b) cause a transmitter to send a calibration pattern to the receiver by: setting the differential voltage on the line to a non-zero value during a non-zero-phase; and setting the differential voltage on the line to zero during a subsequent zero-phase; c) compare the differential voltage on the line during the zero-phase with a reduced-bit-value-threshold, wherein the reduced-bit-value-threshold is less than a bit-value-threshold that is used during active communication. If the differential voltage on the line during the zero-phase exceeds the reduced-bit-value-threshold, then the calibration apparatus adjusts the value of the variable termination-resistance and returns to step b). If the differential voltage on the line during the zero-phase does not exceed the reduced-bit-value-threshold, then the calibration apparatus stores the current value of the variable termination-resistance for subsequent use during active communication.

20 Claims, 7 Drawing Sheets

(56) References Cited

U.S. PATENT DOCUMENTS

2006/0006902 A1\* 1/2006 Sagiv ................. H04L 25/0278
                                                      326/30
2014/0029702 A1\* 1/2014 Wu .................... H04L 25/0292
                                                      375/340

\* cited by examiner

CALIBRATION APPARATUS FOR A COMMUNICATION SYSTEM

CROSS-REFERENCE TO RELATED APPLICATIONS

This application claims the priority under 35 U.S.C. § 119 of European Patent application no. 22306236.5, filed on 18 Aug. 2022, the contents of which are incorporated by reference herein.

FIELD

The present disclosure relates to a calibration apparatus for a communication system, specially one that communicates using differential voltages.

SUMMARY

According to a first aspect of the present disclosure there is provided a calibration apparatus for a communication system, wherein the communication system comprises:
  a transmitter;
  a receiver, which comprises a variable termination-resistance; and
  a line for communicating differential voltage signals between the transmitter and the receiver;
wherein the calibration apparatus is configured to:
  a) set the variable termination-resistance to a predetermined value;
  b) cause the transmitter to send a calibration pattern to the receiver by:
    setting the differential voltage on the line to a non-zero value during a non-zero-phase; and
    setting the differential voltage on the line to zero during a subsequent zero-phase;
  c) compare the differential voltage on the line during the zero-phase with a reduced-bit-value-threshold, wherein the reduced-bit-value-threshold is less than a bit-value-threshold that is used during active communication; and
    if the differential voltage on the line during the zero-phase exceeds the reduced-bit-value-threshold, then adjust the value of the variable termination-resistance and return to step b); or
    if the differential voltage on the line during the zero-phase does not exceed the reduced-bit-value-threshold, then store the current value of the communication.

Advantageously, such an apparatus can calibrate the communication system such that it is more robust. In particular, more robust to rebound effects from the variable termination-resistance at the receiver side. Additionally, the calibration apparatus can enable the power consumption of the communication system to be reduced.

In one or more embodiments, the calibration apparatus is configured to compare the differential voltage during the zero-phase on the line at the transmitter side with the reduced-bit-value-threshold.

In one or more embodiments, the calibration apparatus is configured to compare the differential voltage during the zero-phase on the line at the receiver side with the reduced-bit-value-threshold.

In one or more embodiments, the calibration apparatus is configured to:
  b) cause the transmitter to send the calibration pattern to the receiver by:
    setting the differential voltage on the line to a first non-zero value during a first-non-zero-phase;
    setting the differential voltage on the line to a second non-zero value during a second-non-zero-phase, wherein the second non-zero value has a different sign to the first non-zero value; and
    setting the differential voltage on the line to zero during the subsequent zero-phase.

In one or more embodiments, the calibration apparatus is configured to:
  set the variable termination-resistance to (i) a maximum or (ii) a minimum predetermined value at step a); and
  if the differential voltage on the line during the zero-phase exceeds the reduced-bit-value-threshold, then adjust the value of the variable termination-resistance by respectively (i) reducing or (ii) increasing the variable termination-resistance and return to step b).

In one or more embodiments, the calibration apparatus is configured to:
  if the differential voltage on the line during the zero-phase does not exceed the reduced-bit-value-threshold, then store the current value of the variable termination-resistance in memory for subsequent use during active communication.

In one or more embodiments, the calibration apparatus is configured to:
  if the differential voltage on the line during the zero-phase does not exceed the reduced-bit-value-threshold, then store the current value of the variable termination-resistance by not adjusting the variable termination resistance for subsequent use during active communication.

In one or more embodiments, the communication system is for communicating Transformer Physical Layer, TPL, signals.

In one or more embodiments, the calibration apparatus is configured to:
  c) compare the differential voltage on the line during the zero-phase with a reduced-positive-value-threshold, wherein the reduced-positive-value-threshold is less than a positive-value-threshold that is used during active communication;
  compare the modulus of the differential voltage on the line during the zero-phase with a reduced-negative-value-threshold, wherein the reduced-negative-value-threshold is less than a negative-value-threshold that is used during active communication; and
    (i) if the differential voltage on the line during the zero-phase is greater than the reduced-positive-value-threshold, or (ii) if the modulus of the differential voltage on the line during the zero-phase is greater than the reduced-negative-value-threshold, then adjust the value of the variable termination-resistance and return to step b); or
    (i) if the differential voltage on the line during the zero-phase is not greater than the reduced-positive-value-threshold, or (ii) if the modulus of the differential voltage on the line during the zero-phase is not greater than the reduced-negative-value-threshold, then store the current value of the communication.

In one or more embodiments, the calibration apparatus is configured to perform steps a), b) and c) at start-up of the communications system.

According to a further aspect of the present disclosure, there is provided a communication system comprising:
  a transmitter;

a receiver, which comprises a variable termination-resistance;
a line for communicating differential voltage signals between the transmitter and the receiver; and
any calibration apparatus disclosed herein.

According to a further aspect of the present disclosure, there is provided a method of calibrating a communication system, wherein the communication system comprises:
a transmitter;
a receiver, which comprises a variable termination-resistance; and
a line for communicating differential voltage signals between the transmitter and the receiver;
wherein the method comprises:
a) setting the variable termination-resistance to a predetermined value;
b) the transmitter sending a calibration pattern to the receiver by:
setting the differential voltage on the line to a non-zero value during a non-zero-phase; and
setting the differential voltage on the line to zero during a subsequent zero-phase; and
c) comparing the differential voltage on the line during the zero-phase with a reduced-bit-value-threshold, wherein the reduced-bit-value-threshold is less than a bit-value-threshold that is used during active communication; and
if the differential voltage on the line during the zero-phase exceeds the reduced-bit-value-threshold, then adjusting the value of the variable termination-resistance and returning to step b); or
if the differential voltage on the line during the zero-phase does not exceed the reduced-bit-value-threshold, then storing the current value of the variable termination-resistance for subsequent use during active communication.

According to a further aspect of the present disclosure, there is provided a calibration apparatus for a communication system, wherein the communication system comprises:
a transmitter;
a receiver, which comprises a variable termination-resistance; and
a line for communicating differential voltage signals between the transmitter and the receiver;
wherein the calibration apparatus is configured to cause the transmitter to:
a) send a calibration pattern to the receiver by:
setting the differential voltage on the line to a non-zero value during a non-zero-phase; and
setting the differential voltage on the line to zero during a subsequent zero-phase;
b) compare the differential voltage on the line during the zero-phase with a reduced-bit-value-threshold, wherein the reduced-bit-value-threshold is less than a bit-value-threshold that is used during active communication; and
if the differential voltage on the line during the zero-phase exceeds the reduced-bit-value-threshold, then wait for the value of the termination-resistance at the receiver to be adjusted and return to step a); or
if the differential voltage on the line during the zero-phase does not exceed the reduced-bit-value-threshold, then end the method of calibration such that the current value of the variable termination-resistance is usable for subsequent active communication.

According to a further aspect of the present disclosure, there is provided a calibration apparatus for a communication system, wherein the communication system comprises:
a transmitter;
a receiver, which comprises a variable termination-resistance; and
a line for communicating differential voltage signals between the transmitter and the receiver;
wherein the calibration apparatus is configured to cause the receiver to:
a) set the termination-resistance to a predetermined value;
b) receive a calibration pattern from the transmitter, wherein the calibration pattern comprises:
a non-zero-phase, during which the differential voltage on the line has been set to a non-zero value by the transmitter; and
a subsequent zero-phase, during which the differential voltage on the line has been set to zero by the transmitter;
c) compare the differential voltage on the line during the zero-phase with a reduced-bit-value-threshold, wherein the reduced-bit-value-threshold is less than a bit-value-threshold that is used during active communication; and
if the differential voltage on the line during the zero-phase exceeds the reduced-bit-value-threshold, then adjust the value of the termination-resistance and returning to step b); or
if the differential voltage on the line during the zero-phase does not exceed the reduced-bit-value-threshold, then: store the current value of the termination-resistance for subsequent use during active communication.

According to a further aspect of the present disclosure, there is provided a communication system comprising:
a transmitter;
a receiver, which comprises a variable termination-resistance;
a line for communicating differential voltage signals between the transmitter and the receiver; and
any calibration apparatus disclosed herein.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

Figure 1:
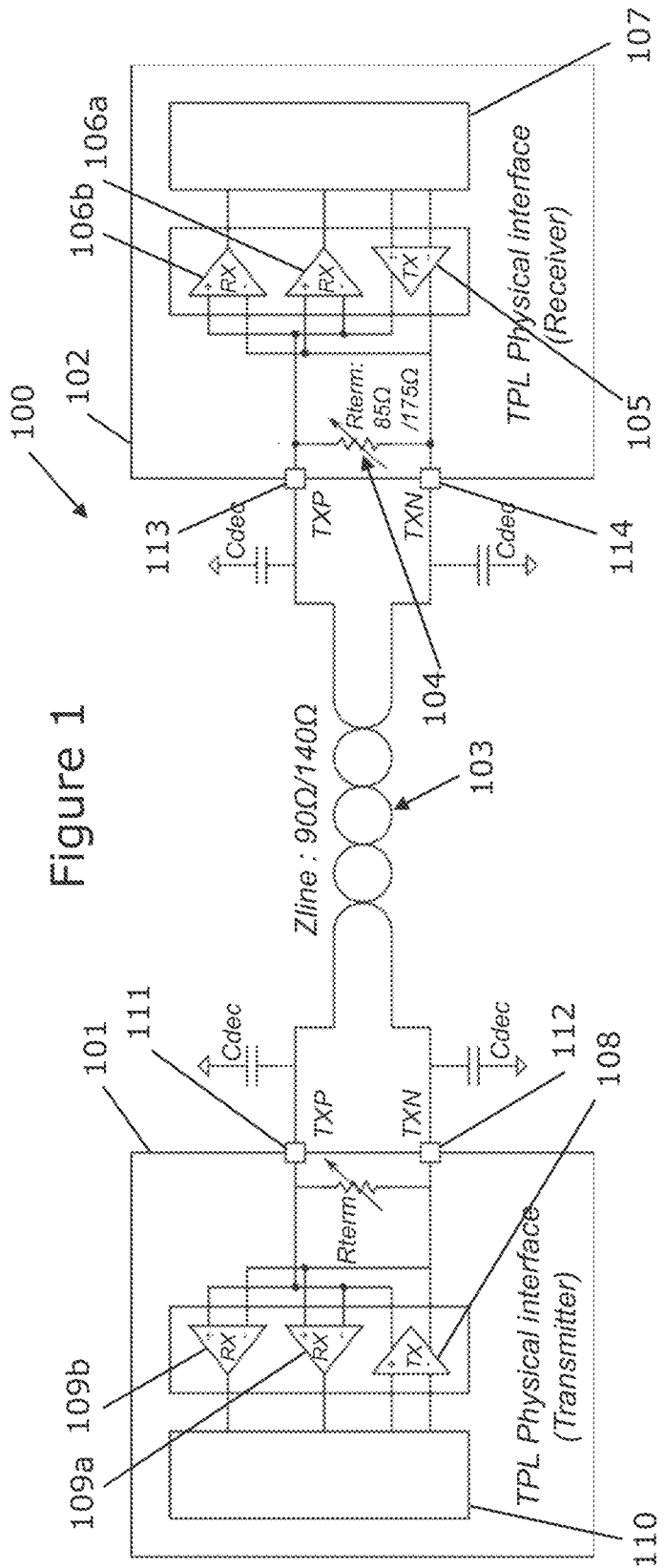
FIG. 1 shows a communication system.

FIG. 1 shows a communication system 100, which includes a transmitter 101 and a receiver 102. In this example, the communication system 100 is part of a battery management system (BMS) that communicates Transformer Physical Layer (TPL) signals between the transmitter 101 and the receiver 102. Therefore, the transmitter 101 can be referred to as a TPL transmitter and the receiver 102 can be referred to as a TPL receiver. Such TPL interfaces can be well-suited to BMS products where communication robustness is an important parameter.

The communication system 100 includes a line/cable 103 for communicating differential voltage signals between the transmitter 101 and the receiver 102. The characteristic impedance of the cable 103 that is used can have a wide range of values, for example from 90Ω up to 140Ω (as non-limiting examples). The transmitter 101 includes two terminals for connecting to the cable 103. These two terminals are: a transmitter-positive-terminal, TXP, 111; and a transmitter-negative-terminal, TXN, 112. The receiver 102 also includes two terminals for connecting to the cable 103. These two terminals are: a receiver-positive-terminal, TXP, 113; and a receiver-negative-terminal, TXN, 114.

The transmitter 101 includes a digital controller 110, a transmitter-driver 108 and two transmitter-comparators 109a, 109b. In order to transmit data over the cable 103, the digital controller 110 provides signalling to the transmitter-driver 108 to provide appropriate differential voltage levels at the transmitter-positive-terminal, TXP, 111 and the transmitter-negative-terminal, TXN, 112. The two transmitter-comparators 109a, 109b are also connected to the transmitter-positive-terminal, TXP, 111 and the transmitter-negative-terminal, TXN, 112 such that they can receive differential voltage signalling from the cable 103. In this example, a first-transmitter-comparator 109a compares the differential voltage on the cable 103 with a positive-value-threshold to determine if there is a positive differential voltage on the cable 103. The positive-value-threshold represents a positive threshold, which can set to the typical differential voltage divided by two (thereby representing the middle value of a differential signal). A second-transmitter-comparator 109b compares the differential voltage on the cable 103 with a negative-value-threshold to determine if there is a negative differential voltage on the cable 103. The negative-value-threshold represents a negative threshold, which again can set to the typical differential voltage divided by two (thereby representing the middle value of a differential signal). As will be discussed below, positive and negative differential voltages can be driven on to the cable 103 to encode symbols for communicating between the transmitter 101 and the receiver 102.

Turning now to the receiver 102, the receiver 102 includes a digital controller 107, a transmitter-driver 105 and two receiver-comparators 106a, 106b. The two receiver-comparators 106a, 106b are connected to the receiver-positive-terminal, TXP, 113 and the receiver-negative-terminal, TXN, 114 such that they can receive differential voltage signalling from the cable 103. In this example, a first-receiver-comparator 106a compares the differential voltage on the cable 103 with a positive-value-threshold to determine if there is a positive differential voltage on the cable 103. A second-receiver-comparator 106b compares the differential voltage on the cable 103 with a negative-value-threshold to determine if there is a negative differential voltage on the cable 103. The output signals from the two receiver-comparators 106a, 106b are provided to the digital controller 107 such that it can decode the communication that has been provided over the cable 103.

The receiver 102 includes a variable termination-resistance 104, which is connected in series between the receiver-positive-terminal, TXP, 113; and the receiver-negative-terminal, TXN, 114. Especially in BMS products, such a termination-resistance can be an integrated resistor that has a wide absolute variation. In some instances, following manufacture of the receiver 102, a test operation can be performed to set/trim the value of the termination-resistance 104 to narrow the range of the variable termination-resistance 104. As a consequence, the value of the variable termination-resistance 104 is not necessarily well-suited to a particular application that the receiver 102 will be used in. For example, when the receiver 102 is manufactured it is not known what specific cable 103 it will be connected to, and therefore a well-matched value for the termination-resistance 104 cannot be predicted.

If the termination-resistance 104 is not well-matched to the characteristic impedance of the cable 103, then there can be a rebound effect of signalling that is transmitted by the transmitter 101 that is reflected back on to the line/cable 103 by the receiver 102. Such reflected signalling can degrade the quality of the ongoing communication between the transmitter 101 and the receiver 102.

Example embodiments of the invention, which will be described below, can provide a calibration method to adapt the value of the termination-resistance 104 to the characteristic impedance of the cable 103 that is used according to the application environment. With such examples, the reflection of signalling at the receiver side can be reduced, and in some examples almost cancelled, which leads to improved signal shaping. The communication robustness can then be drastically improved.

Figure 2:
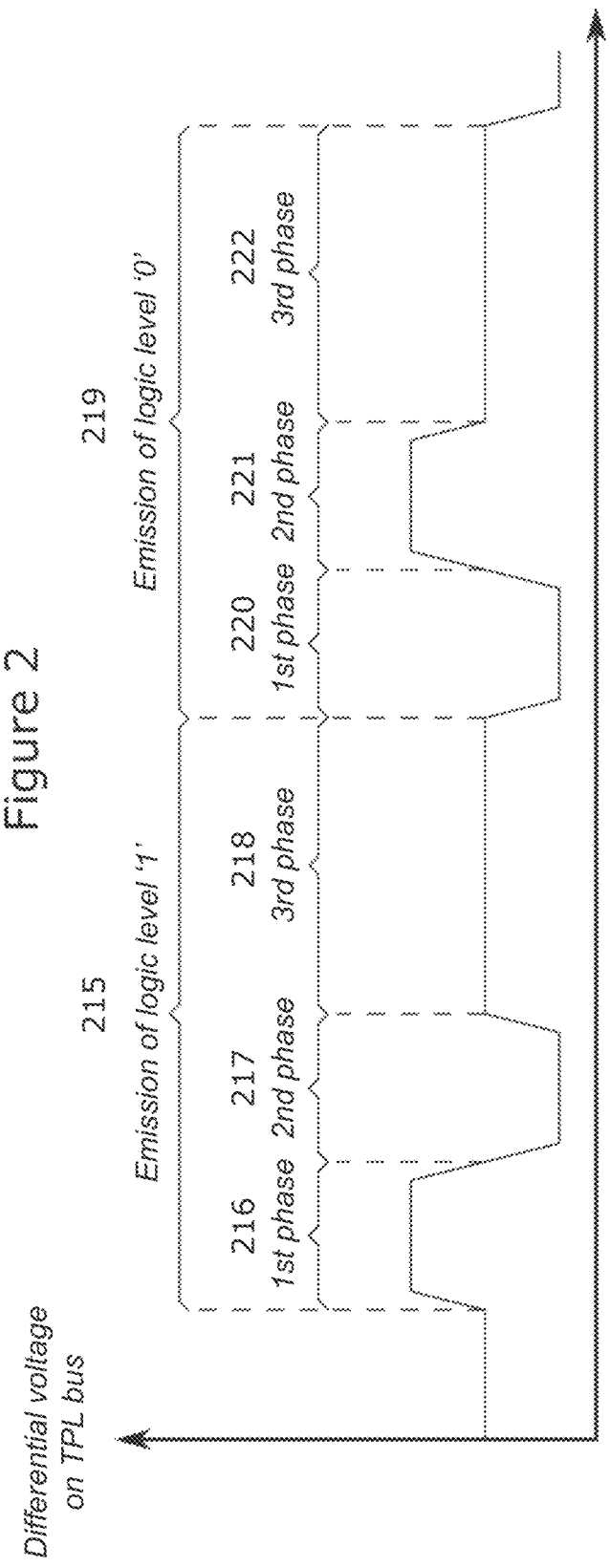
FIG. 2 shows an example TPL transmission sequence.

FIG. 2 shows an example TPL transmission sequence. Differential voltage is shown on the vertical axis. Time is shown on the horizontal axis.

The principle of data transmission on the TPL bus is as follows. Each transmitter bit can take the logic value '1' or '0' according to a sequence of differential voltage levels. The digital controller 110 at the transmitter 101 causes the transmitter-driver 108 to provide appropriate differential voltage levels at the transmitter-positive-terminal, TXP, 111 and the transmitter-negative-terminal, TXN, 112 in order to communicate a '1' or a '0' to the receiver 102 over the cable 103.

If a logic level '1' is to be transmitted (as identified in FIG. 2 with reference 215), then the transmitter 102 proceeds by encoding the following differential voltages:
  in a first phase 216, a differential positive voltage is applied to the TPL bus line (i.e. the cable 103);
  then in a second phase 217, a differential negative voltage is applied to the TPL bus line (i.e. the cable 103); and
  then in a third phase 218, no differential voltage is applied.

The first phase 216 and the second phase 217 can be considered as examples of non-zero phases. This is because the differential voltage on the line/cable 103 is set to a non-zero value (either positive or negative) during these phases. The third phase 218 can be considered as an example of a subsequent zero-phase. This is because the differential voltage on the line/cable 103 is set to zero during this phase.

In this example, the duration of the first phase 216 and the second phase 217 is approximately the same. The duration of the third phase 218 is about twice the duration of the first phase 216 or the second phase 217. By way of non-limiting example: the duration of the first phase 216 may be about 100 ns (corresponding to 5 clock cycles); the duration of the second phase 217 may be about 100 ns (corresponding to 5 clock cycles); and the duration of the third phase 218 may be about 200 ns-300 ns (corresponding to 10-15 clock cycles).

If a logic level '0' is to be transmitted (as identified in FIG. 2 with reference 219), then the transmitter 102 proceeds by encoding the following differential voltages:
- in a first phase 220, a differential negative voltage is applied to the TPL bus line (i.e. the cable 103);
- then in a second phase 221, a differential positive voltage is applied to the TPL bus line (i.e. the cable 103); and
- then in a third phase 222, no differential voltage is applied.

That is, if a logic level '0' is to be broadcast, then a sequence is that used that is equivalent to the sequence for logic level '1' but with the first and second phases inverted.

It will be appreciated from the above description that the main parameter of the communication is the differential voltage on the line/cable 103. Depending on the level of the differential voltage that is created by the transmitter 101, and also depending upon the attenuation of the line/cable 103, the levels of the thresholds that are applied by the two receiver-comparators 106a, 106b at the receiver 102 are set such that incoming data can be decoded. These thresholds can be referred to as bit-value-thresholds. In order to meet current consumption specifications, the level of the differential voltage signal is often chosen as low as possible. As a result, in some applications the thresholds can be defined as about at 0.5V. The rebound effect, which is discussed above, should be reduced to prevent dummy decoding (i.e. decoding of symbols that have not actually been transmitted by the transmitter 101).

Figure 3:
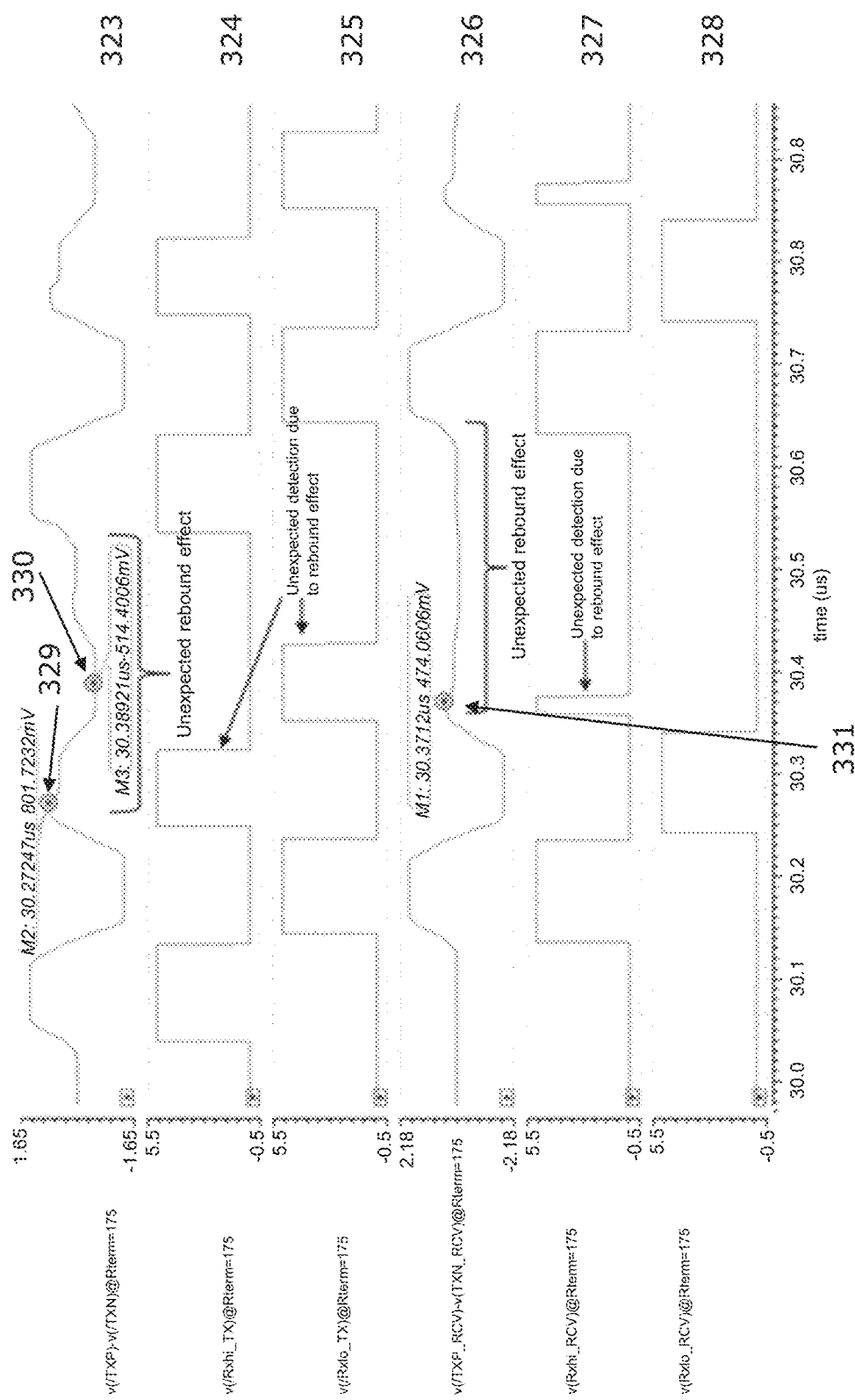
FIG. 3 shows the results of a simulation of the communications system of FIG. 1.

FIG. 3 shows the results of a simulation of the communications system of FIG. 1 when the variable termination-resistance, Rterm, at the receiver is set at 175Ω and the impedance of the line, Zline (also referred to as Z0) is 90Ω. FIG. 3 shows the following plots:
- 323—the differential voltage between the transmitter-positive-terminal (TXP, 111) and the transmitter-negative-terminal (TXN, 112) at the transmitter (v(/TXP)–v(TXN));
- 324—the voltage at the output of the first-transmitter-comparator 109a, which is set high when the differential voltage 323 at the transmitter exceeds (i.e. is greater than) the positive-value-threshold;
- 325—the voltage at the output of the second-transmitter-comparator 109b, which is set high when the differential voltage 323 at the transmitter exceeds (i.e. is more negative than) the negative-value-threshold;
- 326—the differential voltage between the receiver-positive-terminal (TXP, 113) and the receiver-negative-terminal (TXN, 114) at the receiver (v(/TXP_RCV)–v(TXN)RCV));
- 327—the voltage at the output of the first-receiver-comparator 106a, which is set high when the differential voltage 326 at the receiver exceeds (i.e. is greater than) the positive-value-threshold; and
- 328—the voltage at the output of the second-receiver-comparator 106b, which is set high when the differential voltage 326 at the receiver exceeds (i.e. is more negative than) the negative-value-threshold.

Examples will be provided below where the differential voltage levels on either side of the line 103 are processed as part of a calibration routine. Similarly, the outputs of the comparators 106a, 106b, 109a, 109b at either of the transmitter 101 and the receiver 102 (and therefore also on both sides of the line 103) can also be used.

FIG. 3 shows that there is a big rebound on the transmitter side when transitioning from a negative differential signal (2nd phase) to a pause (3rd phase, where differential signal should be close to 0V). The differential voltage 323 at the transmitter side has a large rebound 329 at around 0.8V, which has almost the same duration as the 1st phase. This is illustrated by the undesired transition in the voltage at the output of the first-transmitter-comparator 324 to a high value when it should be low. Then there is a large negative rebound 330 at around –0.5V, which has almost the same duration as the 2nd phase. This is illustrated by the undesired transition in the voltage at the output of the second-transmitter-comparator 325 to a high value when it should be low.

Therefore, the rebound effect that is visible in FIG. 3 creates signals at the output of the receiver (Rxhi_TX 324 and Rxlo_TX 325) that are different from the expected transmitted signal. Thus, the rebound effect creates an error at the transmitter side.

Looking also at the differential signal 326 at the receiver side (Vtxp_RCV–Vtxn_RCV), we can see that during the beginning of the 3rd phase, there is a rebound effect 331 that is created by a second reflection at the transmitter side. This unwanted rebound effect is detected by the Rxhi_RCV output signal 327. Therefore, we can see that the value of Rterm (175Ω) that is used for the simulation of FIG. 3 creates a communication error due to a bad adaptation between the receiver termination-resistance and cable characteristic impedance Zline/Z0.

Example embodiments of the present disclosure provide a calibration method or apparatus that enables the termination-resistance 104 of the receiver 102 to be adapted to the application case in which the communication system is actually implemented in order to reduce or avoid communication errors.

Figure 4:
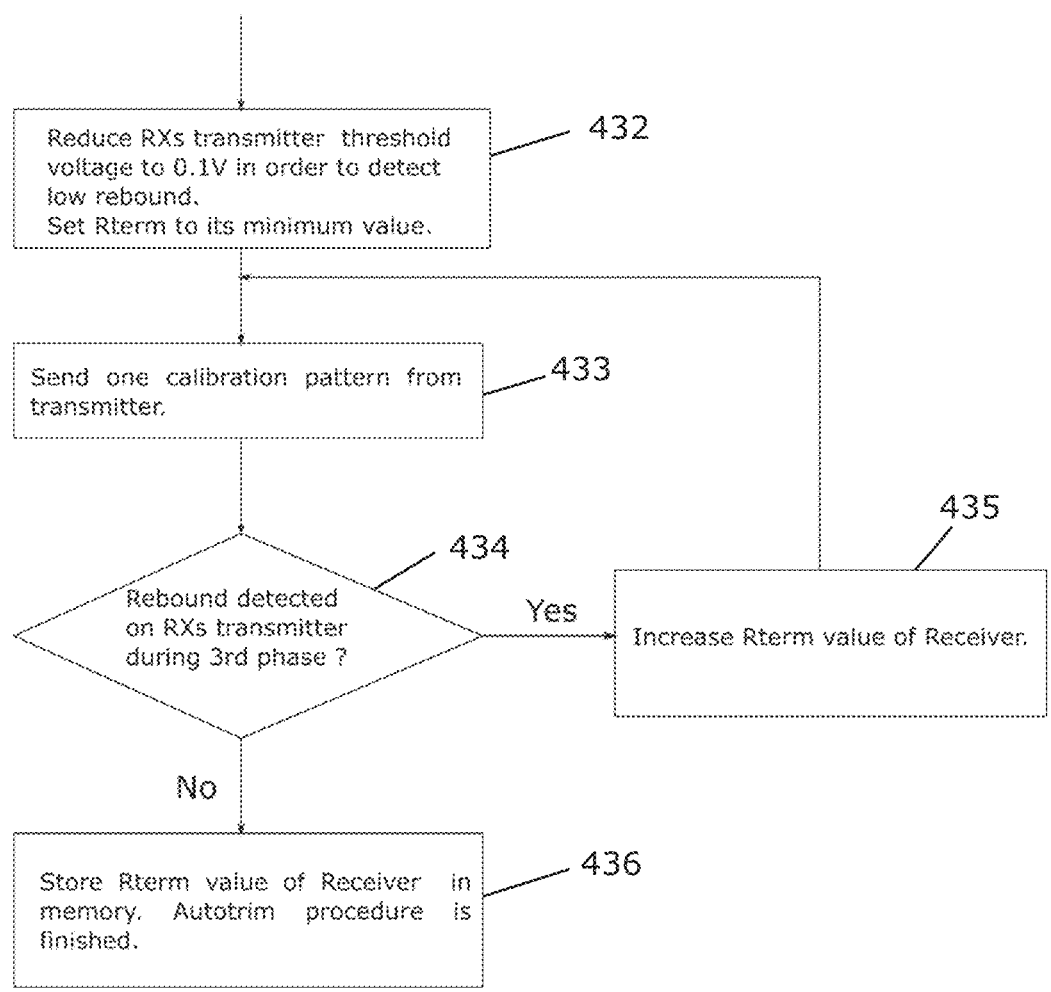
FIG. 4 illustrates an example embodiment of a calibration method according to the present disclosure.

FIG. 4 illustrates an example embodiment of a calibration method according to the present disclosure. The calibration method can be considered as an autocalibration routine because it does not require any steps to be performed manually.

At step 432, the method sets the variable termination-resistance at the receiver to a predetermined value. This predetermined value represents a starting point for the subsequent processing steps that will adjust the value of the variable termination-resistance until it reaches an acceptable value. The predetermined value of the variable termination-resistance may its minimum value (as illustrated in FIG. 4), its maximum value, or any other suitable starting point.

Also at step 432 in this example, the method sets:
- the positive-value-threshold that is applied by the first-transmitter-comparator 109a to a reduced-positive-value-threshold; and the negative-value-threshold that is applied by the second-transmitter-comparator 109*b* to a reduced-negative-value-threshold.

The reduced-positive-value-threshold and the reduced-negative-value-threshold are lower (i.e. closer to zero) than the corresponding bit-value-thresholds that are used during active communication (i.e. normal operation/normal communication; not during the calibration routine). In this way, during the calibration routine, the first-transmitter-comparator 109*a* and the second-transmitter-comparator 109*b* will create high output signals for lower differential voltages than would be the case during active communication. That is, the transmitter-comparators 109*a*, 109*b* have been made more sensitive such that relatively low rebounds can be detected. In this example, the reduced-positive-value-threshold is set at 0.1V and the reduced-negative-value-threshold is effectively set at −0.1V. Therefore, rebounds as low as 0.1V will be detectable during the calibration routine. (In the implementation of FIG. 1 the inputs to the two transmitter-comparators 109*a*, 109*b* are the opposite way around to each other, such that a positive 0.1V threshold can be applied by each comparator 109*a*, 109*b* in order to achieve the desired functionality.)

At step 433, the transmitter 101 sends a calibration pattern to the receiver 102 by:
   setting the differential voltage on the line 103 to a non-zero value (which could be positive or negative) during a non-zero-phase; and
   setting the differential voltage on the line 103 to zero during a subsequent zero-phase.

Such a calibration pattern can be propagated through the line 103 as one of the two symbols (logic '1' or logic '0') that are shown in FIG. 2, in which case the first- and/or second-phase can be considered as the non-zero-phase of the calibration pattern and the third phase can be considered as the zero-phase of the calibration pattern. For instance, the transmitter can send the calibration pattern to the receiver by: setting the differential voltage on the line to a first non-zero value (either positive or negative) during a first-non-zero-phase; setting the differential voltage on the line to a second non-zero value (the other one of positive and negative) during a second-non-zero-phase; and setting the differential voltage on the line to zero during the subsequent zero-phase. Another, different, example of a suitable calibration pattern will be provided below.

At step 434, the method compares the differential voltage on the line 103 during the zero-phase (at either the transmitter or the receiver) with the reduced-positive-value-threshold and the reduced-negative-value-threshold. That is, the comparators 106*a*, 106*b*, 190*a*, 109*b* at either the transmitter 101 or the receiver 102 can process the differential voltage on the line 103 with reduced thresholds in order to check for any rebounds with an increased sensitivity than would be the case during normal operation. In this way, the RX values are sampled in order to check if a rebound happens. If there is no significant rebound, then the differential voltage should be less than (i.e. closer to zero than) the reduced-bit-value-thresholds during the zero-phase. In other words, the modulus of the differential voltage should be less than the reduced-bit-value-thresholds during the zero-phase if there is no significant rebound. As will be appreciated from the description that follows, using reduced thresholds enables the variable termination-resistance to be more accurately matched to the impedance of the line 103 and therefore calibrates the communication system such that it is more robust.

If the differential voltage on the line during the zero-phase exceeds the reduced-bit-value-threshold, then, at step 435, the method adjusts the value of the variable termination-resistance and returns to step 433 to perform another iteration of the method to try and improve the performance of the communication system further. In this example, the method adjusts the value of the variable termination-resistance 104 by increasing it's value. This is because the value of the variable termination-resistance 104 is initially set as its minimum value. It will be appreciated that if the value of the variable termination-resistance 104 was initially set as its maximum value, then the method would reduce the value of the variable termination-resistance 104 at step 435.

In this example, the method adjusts the value of the variable termination-resistance 104 by a predetermined/fixed step size at step 435. This represents a relatively straightforward way of implementing the method of FIG. 4. In other examples, a more sophisticated algorithm can be implemented. For instance, the method can: determine the duration of the detected rebound event (i.e. the length of time that the differential voltage exceeds one of the reduced-bit-value-thresholds); and adjust the value of the variable termination-resistance 104 by an amount that is based on the duration of the detected rebound event. If the duration of the detected rebound event is relatively large then the method can adjust the value of the variable termination-resistance 104 by a relatively large amount. Similarly, if the duration of the detected rebound event is relatively short then the method can adjust the value of the variable termination-resistance 104 by a relatively small amount. Such processing can be readily implemented by applying an algorithm to the determined duration to calculate the size of the adjustment of the variable termination-resistor 104, or by using a look-up-table, as non-limiting examples.

If the differential voltage on the line 103 during the zero-phase does not exceed the reduced-bit-value-threshold, then the calibration routine can be considered as having reached a successful conclusion. This is on the basis that no significant rebound events have been detected. Therefore, the receiver impedance has been successfully adapted to the line 104. At step 436, the method stores the current value of the variable termination-resistance (i.e. the last one that was used that has resulted in the avoidance of any detected rebound events) for subsequent use during active communication. The method can store the current value of the variable termination-resistance in memory such that it can be accessed and used by the receiver 102 during subsequent active communication. Alternatively, the method can store the current value of the variable termination-resistance by not adjusting the variable termination resistance 104 such that the subsequent active communication can simply follow on from the calibration routine without any further changes to the value of the variable termination-resistance 104. In this way, the current value of the variable termination-resistance 104 can be considered as being stored by the variable termination-resistance 104 itself.

The calibration method of FIG. 4 can be performed at start-up of the communications system, at which time the bus and receiver characteristics can be automatically evaluated in order set the variable termination resistance at the receiver.

As will be appreciated from the discussion that follows, one or more aspects of the calibration routine can be implemented by components associated with one or both of the transmitter 101 or the receiver 102 (such as the digital controllers 110, 107, the comparators 109a, 109b, 106a, 106b, for example) or by a centralised controller (not shown in FIG. 1).

Figure 5:
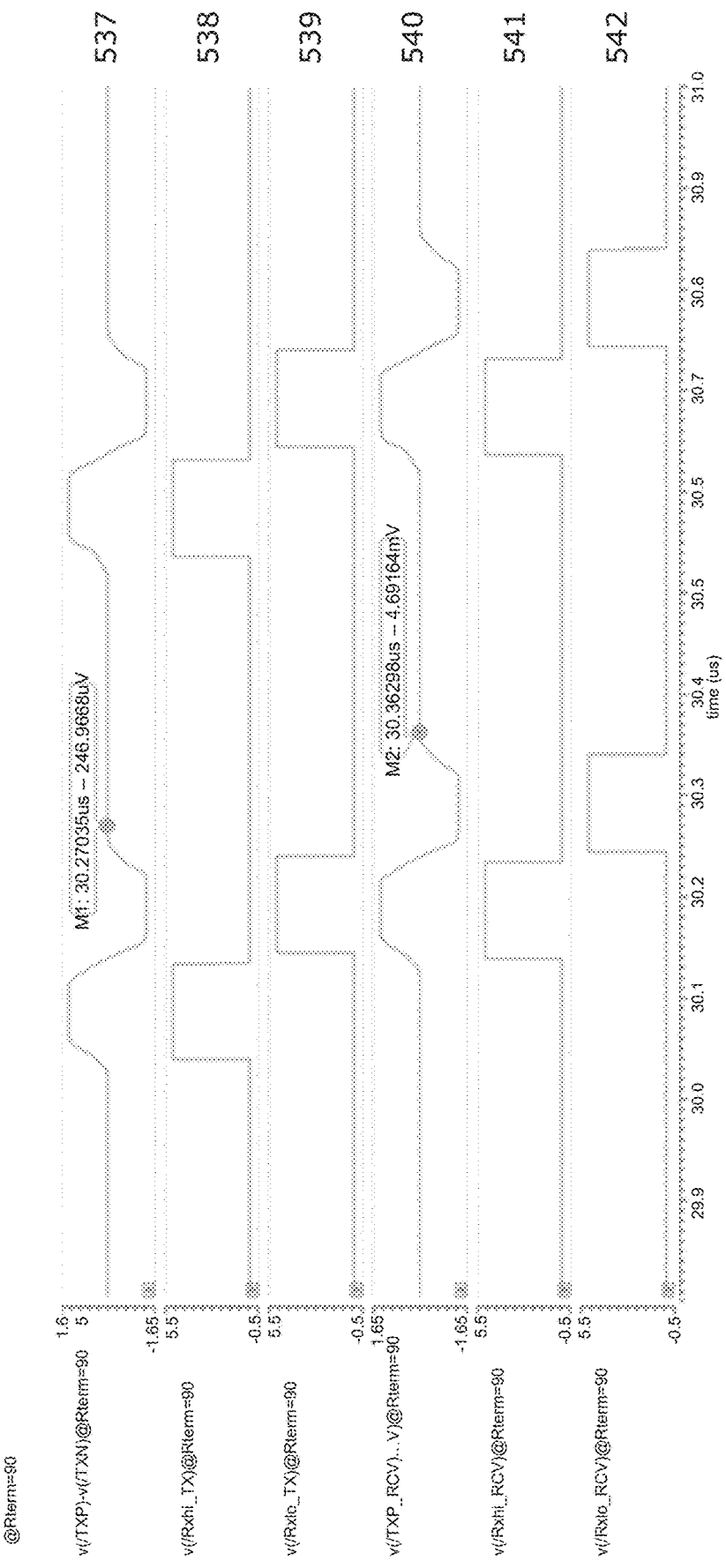
FIG. 5 shows the results of a simulation of the communications system of FIG. 1 when the variable termination-resistance at the receiver is set following a successful conclusion to the calibration method of FIG. 4.

FIG. 5 shows the results of a simulation of the communications system of FIG. 1 when the variable termination-resistance, Rterm, at the receiver is set at 90Ω following a successful conclusion to the calibration method of FIG. 4. In the same way as the simulation results of FIG. 3, the impedance of the line, Zline (also referred to as Z0) is 90Ω.

As can be seen from FIG. 5, following the calibration method of FIG. 4, the variable termination-resistance 104 at the receiver side 102 has been successfully adapted to a value that is close to the characteristic impedance of the line/cable 103. It can be seen from FIG. 5 that during the third phase of the differential voltage signal on the bus/line 103, at both the transmitter side (as shown by plot 537 in FIG. 5) and the receiver side (as shown by plot 540 in FIG. 5), there is almost no rebound. It can also be seen from plots 538, 539, 541 and 542 that the outputs of the receivers (as represented by the comparators 106a, 106b, 109a, 109b in FIG. 1) at both the transmitter side 101 and the receiver side 102 do not detect any differential signal during the third phase. Therefore, there are no errors at their outputs.

It can be seen from FIG. 5 that performing the method of FIG. 4 significantly improves the communication robustness of the communication system and that the signals at both ends of the line/cable 103 are clean.

As will be discussed below, performing the calibration routine of FIG. 4 also advantageously reduces power consumption.

Figure 6:
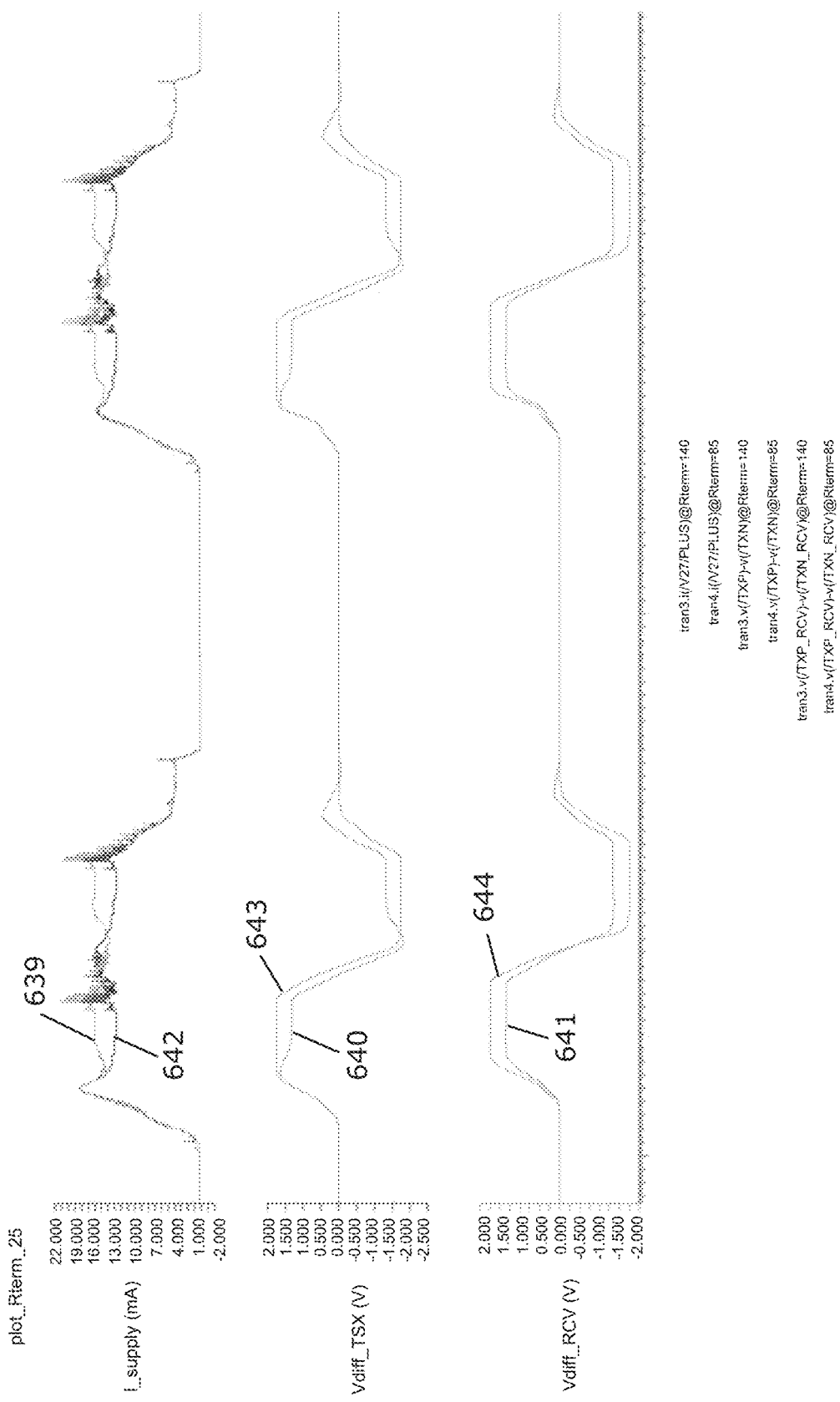
FIG. 6 shows simulation results for a communication system that has a 2.5 m cable.

FIG. 6 shows simulation results for a communication system that has a 2.5 m cable of characteristic impedance of Z0=140Ω. Two sets of data are shown in each plot: one for the variable termination-resistance, Rterm, having a value of 85Ω, which is an example of an initial value before the calibration method of FIG. 4 is performed; and one for the variable termination-resistance, Rterm, having a value of 140Ω, which is an example of a value after the autocalibration method of FIG. 4 is performed.

The upper plot in FIG. 6 shows current consumption on the vertical axis and time on the horizontal axis. A first set of data 639 is shown in the upper plot, for a simulation with the variable termination-resistance, Rterm, set as 85Ω. A second set of data 642 is also shown in the upper plot, for a simulation with the variable termination-resistance, Rterm, set as 140Ω.

The middle plot in FIG. 6 shows the differential voltage at the positive- and negative-terminals TXP, TXN at the transmitter on the vertical axis and time on the horizontal axis. A first set of data 640 is shown in the middle plot, for a simulation with the variable termination-resistance, Rterm, set as 85Ω. A second set of data 643 is also shown in the middle plot, for a simulation with the variable termination-resistance, Rterm, set as 140Ω.

The lower plot in FIG. 6 shows the differential voltage at the positive- and negative-terminals TXP, TXN at the receiver on the vertical axis and time on the horizontal axis. A first set of data 641 is shown in the middle plot, for a simulation with the variable termination-resistance, Rterm, set as 85Ω. A second set of data 644 is also shown in the middle plot, for a simulation with the variable termination-resistance, Rterm, set as 140Ω.

FIG. 6 shows that the current consumption for Rterm=140Ω is 6.37 mA and is 7.08 mA for Rterm=85Ω. Therefore, performing the calibration routine of FIG. 4 has reduced current consumption by 710 uA. Furthermore, performing the calibration routine of FIG. 4 has also increased the differential signal by 0.4V on both sides of the line 103 (i.e. at both the transmitter side and the receiver side).

Therefore, performing the method of FIG. 4, which can be considered as a self-adaptation protocol, can beneficially reduce consumption and increase the differential signal at the same time. After such self-adaptation, the TPL can benefit from optimized current consumption and communication robustness at the same time.

As can be seen from FIG. 6, for a short line (e.g., less than 5 m) the slight rebound due to a small mismatch between the variable termination-resistance and the impedance of the line/cable 103 cannot be detected in the zero-phase (in this example the third phase) of the calibration pattern. This is because the small rebound that does occur does not arrive back at the transmitter during the zero-phase; instead it arrives back at the transmitter during a non-zero-phase. In such a case, examples disclosed herein can use a different calibration pattern such that any rebound arrives at the transmitter during a zero-phase.

Figure 7:
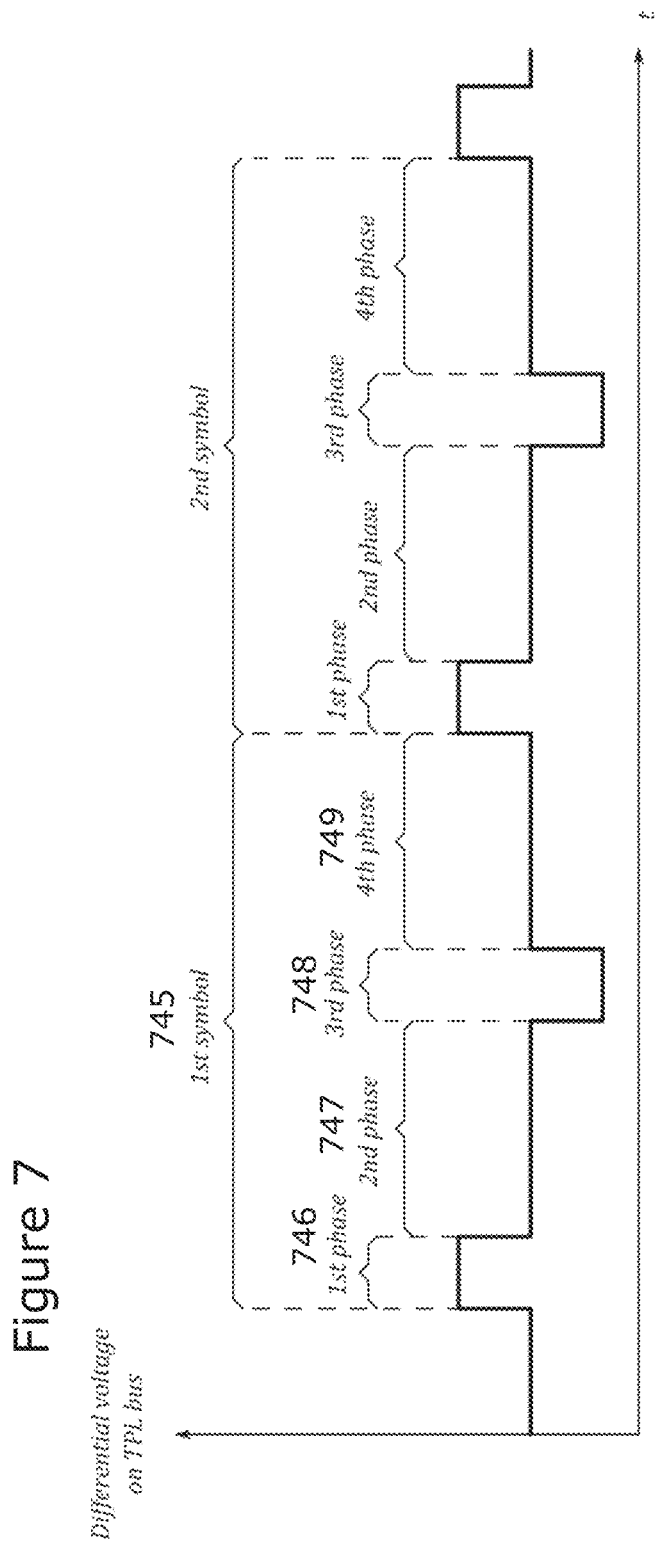
FIG. 7 shows an alternative calibration pattern according to the present disclosure.

FIG. 7 shows an alternative calibration pattern according to the present disclosure.

Examples disclosed herein can use a calibration pattern 745 where the differential signal is created without slew-rate control and with a shorter time for the non-zero-phase 746 (a positive phase in this example). Then a relatively long subsequent zero-phase 747, with no differential signal, can be used. In this example, the symbol of the calibration pattern 745 can then include a second non-zero-phase 748 (a negative phase in this example) and a second zero-phase 749.

The calibration pattern 745 of FIG. 7 can result in rebounds being received back at the transmitter during the zero-phases 747, 749 for cables with a length between 2 m and 20 m. In the example of FIG. 7 the first non-zero-phase 746 and the second non-zero-phase 748 are a single clock cycle long (about 20 ns in duration), and the zero-phases 747, 749 are 12 clock cycles long (about 240 ns in duration.)

It will be appreciated that zero-phases and non-zero-phases with any suitable duration can be used to ensure that any rebounds of the non-zero-phase are received at the transmitter during the zero-phase for any range of lengths of the cable 103.

When the calibration pattern 745 of FIG. 7 is used, step 434 of the calibration method of FIG. 4 can be slightly modified such that it checks detected rebounds during the $2^{nd}$ phase instead of the $3^{rd}$ phase.

In some applications, the non-zero-phase 746, 718 can be made as short as possible (one clock cycle) with only one positive alternance (and the second phase of FIG. 2 can be removed). The calibration method can then check for a rebound on a period where RXs value should be at "low digital-state".

As indicated above, the calibration routine can be performed at either the transmitter side or the receiver, or it can be performed at both the transmitter side and the receiver side.

For example, the following processing can be performed at the transmitter side:
  a) sending a calibration pattern to the receiver by:
    setting the differential voltage on the line to a non-zero value (either positive or negative) during a non-zero-phase; and
    setting the differential voltage on the line to zero during a subsequent zero-phase;
  b) comparing the differential voltage on the line during the zero-phase with a reduced-bit-value-threshold, wherein the reduced-bit-value-threshold is less than a bit-value-threshold that is used during active communication; and if the differential voltage on the line during the zero-phase exceeds the reduced-bit-value-threshold, then waiting for the value of the termination-resistance at the receiver to be adjusted (for example, waiting a predetermined period of time or until an indicator is received that the termination-resistance has been adjusted) and returning to step a); or if the differential voltage on the line during the zero-phase does not exceed the reduced-bit-value-threshold, then ending the method of calibration such that the current value of the variable termination-resistance is usable for subsequent active communication.

In addition, or alternatively, the following processing can be performed at the receiver side:

a) setting the termination-resistance to a predetermined value (e.g. a maximum value or a minimum value);

b) receiving a calibration pattern from the transmitter, wherein the calibration pattern comprises:

a non-zero-phase, during which the differential voltage on the line has been set to a non-zero value (either positive or negative) by the transmitter; and a subsequent zero-phase, during which the differential voltage on the line has been set to zero by the transmitter;

c) comparing the differential voltage on the line during the zero-phase with a reduced-bit-value-threshold, wherein the reduced-bit-value-threshold is less than a bit-value-threshold that is used during active communication; and if the differential voltage on the line during the zero-phase exceeds the reduced-bit-value-threshold, then adjusting the value of the termination-resistance and returning to step b); or if the differential voltage on the line during the zero-phase does not exceed the reduced-bit-value-threshold, then: storing the current value of the termination-resistance for subsequent use during active communication.

In an alternative implementation to the receiver side example that is described above, the comparing step could be performed by the transmitter. In which case, step c) at the receiver side can be replaced with the following:

c) waiting for the transmitter to transmit a further calibration pattern during a predetermined period of time; and if a further calibration pattern is received, then adjusting the value of the termination-resistance and repeating step c); or if no further calibration pattern is received, then storing the current value of the termination-resistance for subsequent use during active communication.

Examples disclosed herein can reduce rebound effects and other noise (such as electromagnetic compatibility (EMC) perturbations or unmatched components) that could lead to communication errors. This is especially the case for all cases where characteristic impedance of the line and the termination resistances are not close to a typical value. Examples disclosed herein can match the termination resistance to the final environment (characteristic impedance of the cable chosen in the application) in order to improve signal behaviour by almost cancelling rebound effect due to reflection. An algorithm is provided that can optimize the termination resistance of the receiver based on the real environment bus. Indeed, in one example the differential voltage can be optimized during two (non-zero) first phases in order to be easily detected by the receiver and the reflection from the receiver side is almost cancelled in order to avoid or reduce decoding errors during third (zero) phase.

Applications of examples disclosed herein include battery management system devices where isolated electrical communication is required, especially where current consumption is a critical parameter: such as BCC (Battery Cell Controller), BJB (Battery Junction Box), TPL physical layer, and isolated communication gateway) . . . . The present innovation is therefore applicable to BMS TPL and any other communication bus based on differential voltage principle, in any domain.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A calibration apparatus for a communication system, wherein the communication system comprises:
 a transmitter;
 a receiver, which comprises a variable termination-resistance; and
 a line for communicating differential voltage signals between the transmitter and the receiver;
wherein the calibration apparatus is configured to:
 a) set the variable termination-resistance to a predetermined value;
 b) cause the transmitter to send a calibration pattern to the receiver by:
  setting the differential voltage on the line to a non-zero value during a non-zero-phase; and
  setting the differential voltage on the line to zero during a subsequent zero-phase;
 c) compare the differential voltage on the line during the zero-phase with a reduced-bit-value-threshold, wherein the reduced-bit-value-threshold is less than a bit-value-threshold that is used during active communication; and
  if the differential voltage on the line during the zero-phase exceeds the reduced-bit-value-threshold, then adjust the value of the variable termination-resistance and return to step b); or
  if the differential voltage on the line during the zero-phase does not exceed the reduced-bit-value-threshold, then store the current value of the variable termination-resistance for subsequent use during active communication.

2. The calibration apparatus of claim 1, wherein the calibration apparatus is configured to compare the differential voltage during the zero-phase on the line at the transmitter side with the reduced-bit-value-threshold.

3. The calibration apparatus of claim 1, wherein the calibration apparatus is configured to compare the differential voltage during the zero-phase on the line at the receiver side with the reduced-bit-value-threshold.

4. The calibration apparatus of claim 1, wherein the calibration apparatus is configured to:
 b) cause the transmitter to send the calibration pattern to the receiver by:
  setting the differential voltage on the line to a first non-zero value during a first-non-zero-phase;
  setting the differential voltage on the line to a second non-zero value during a second-non-zero-phase, wherein the second non-zero value has a different sign to the first non-zero value; and
  setting the differential voltage on the line to zero during the subsequent zero-phase.

5. The calibration apparatus of claim 1, wherein the calibration apparatus is configured to:
 set the variable termination-resistance to (i) a maximum or (ii) a minimum predetermined value at step a); and
 if the differential voltage on the line during the zero-phase exceeds the reduced-bit-value-threshold, then adjust the value of the variable termination-resistance by respectively (i) reducing or (ii) increasing the variable termination-resistance and return to step b).

6. The calibration apparatus of claim 1, wherein the calibration apparatus is configured to:
 if the differential voltage on the line during the zero-phase does not exceed the reduced-bit-value-threshold, then store the current value of the variable termination-resistance in memory for subsequent use during active communication.

7. The calibration apparatus of claim 1, wherein the calibration apparatus is configured to:
 if the differential voltage on the line during the zero-phase does not exceed the reduced-bit-value-threshold, then store the current value of the variable termination-resistance by not adjusting the variable termination resistance for subsequent use during active communication.

8. The calibration apparatus of claim 1, wherein the communication system is for communicating Transformer Physical Layer, TPL, signals.

9. The calibration apparatus of claim 1, wherein the calibration apparatus is configured to:
 c) compare the differential voltage on the line during the zero-phase with a reduced-positive-value-threshold, wherein the reduced-positive-value-threshold is less than a positive-value-threshold that is used during active communication;
  compare the modulus of the differential voltage on the line during the zero-phase with a reduced-negative-value-threshold, wherein the reduced-negative-value-threshold is less than a negative-value-threshold that is used during active communication; and
  (i) if the differential voltage on the line during the zero-phase is greater than the reduced-positive-value-threshold, or (ii) if the modulus of the differential voltage on the line during the zero-phase is greater than the reduced-negative-value-threshold, then adjust the value of the variable termination-resistance and return to step b); or
  (i) if the differential voltage on the line during the zero-phase is not greater than the reduced-positive-value-threshold, or (ii) if the modulus of the differential voltage on the line during the zero-phase is not greater than the reduced-negative-value-threshold, then store the current value of the variable termination-resistance for subsequent use during active communication.

10. The calibration apparatus of claim 1, wherein the calibration apparatus is configured to perform steps a), b) and c) at start-up of the communications system.

11. A communication system comprising:
 a transmitter;
 a receiver, which comprises a variable termination-resistance;
 a line for communicating differential voltage signals between the transmitter and the receiver; and
 the calibration apparatus of claim 1.

12. A method of calibrating a communication system, wherein the communication system comprises:
 a transmitter;
 a receiver, which comprises a variable termination-resistance; and
 a line for communicating differential voltage signals between the transmitter and the receiver;
wherein the method comprises:
 a) setting the variable termination-resistance to a predetermined value;
 b) the transmitter sending a calibration pattern to the receiver by:

setting the differential voltage on the line to a non-zero value during a non-zero-phase; and setting the differential voltage on the line to zero during a subsequent zero-phase; and c) comparing the differential voltage on the line during the zero-phase with a reduced-bit-value-threshold, wherein the reduced-bit-value-threshold is less than a bit-value-threshold that is used during active communication; and if the differential voltage on the line during the zero-phase exceeds the reduced-bit-value-threshold, then adjusting the value of the variable termination-resistance and returning to step b); or if the differential voltage on the line during the zero-phase does not exceed the reduced-bit-value-threshold, then storing the current value of the variable termination-resistance for subsequent use during active communication.

13. A calibration apparatus for a communication system, wherein the communication system comprises:
a transmitter;
a receiver, which comprises a variable termination-resistance; and
a line for communicating differential voltage signals between the transmitter and the receiver;
wherein the calibration apparatus is configured to cause the transmitter to:
a) send a calibration pattern to the receiver by:
setting the differential voltage on the line to a non-zero value during a non-zero-phase; and
setting the differential voltage on the line to zero during a subsequent zero-phase;
b) compare the differential voltage on the line during the zero-phase with a reduced-bit-value-threshold, wherein the reduced-bit-value-threshold is less than a bit-value-threshold that is used during active communication; and if the differential voltage on the line during the zero-phase exceeds the reduced-bit-value-threshold, then wait for the value of the termination-resistance at the receiver to be adjusted and return to step a); or if the differential voltage on the line during the zero-phase does not exceed the reduced-bit-value-threshold, then end the method of calibration such that the current value of the variable termination-resistance is usable for subsequent active communication.

14. A calibration apparatus for a communication system, wherein the communication system comprises:
a transmitter;
a receiver, which comprises a variable termination-resistance; and
a line for communicating differential voltage signals between the transmitter and the receiver;
wherein the calibration apparatus is configured to cause the receiver to:
a) set the termination-resistance to a predetermined value;
b) receive a calibration pattern from the transmitter, wherein the calibration pattern comprises:
a non-zero-phase, during which the differential voltage on the line has been set to a non-zero value by the transmitter; and
a subsequent zero-phase, during which the differential voltage on the line has been set to zero by the transmitter;
c) compare the differential voltage on the line during the zero-phase with a reduced-bit-value-threshold, wherein the reduced-bit-value-threshold is less than a bit-value-threshold that is used during active communication; and if the differential voltage on the line during the zero-phase exceeds the reduced-bit-value-threshold, then adjust the value of the termination-resistance and returning to step b); or if the differential voltage on the line during the zero-phase does not exceed the reduced-bit-value-threshold, then: store the current value of the termination-resistance for subsequent use during active communication.

15. A communication system comprising:
a transmitter;
a receiver, which comprises a variable termination-resistance;
a line for communicating differential voltage signals between the transmitter and the receiver; and
the calibration apparatus of claim 13.

16. A communication system comprising:
a transmitter;
a receiver, which comprises a variable termination-resistance;
a line for communicating differential voltage signals between the transmitter and the receiver; and
the calibration apparatus of claim 14.

17. The calibration apparatus of claim 4, wherein the calibration apparatus is configured to:
set the variable termination-resistance to (i) a maximum or (ii) a minimum predetermined value at step a); and
if the differential voltage on the line during the zero-phase exceeds the reduced-bit-value-threshold, then adjust the value of the variable termination-resistance by respectively (i) reducing or (ii) increasing the variable termination-resistance and return to step b).

18. The calibration apparatus of claim 4, wherein the calibration apparatus is configured to:
if the differential voltage on the line during the zero-phase does not exceed the reduced-bit-value-threshold, then store the current value of the variable termination-resistance in memory for subsequent use during active communication.

19. The calibration apparatus of claim 4, wherein the calibration apparatus is configured to:
if the differential voltage on the line during the zero-phase does not exceed the reduced-bit-value-threshold, then store the current value of the variable termination-resistance by not adjusting the variable termination resistance for subsequent use during active communication.

20. The calibration apparatus of claim 4, wherein the calibration apparatus is configured to compare the differential voltage during the zero-phase on the line at the transmitter side with the reduced-bit-value-threshold.

* * * * *